US012019684B2

(12) United States Patent
Henriques et al.

(10) Patent No.: US 12,019,684 B2
(45) Date of Patent: Jun. 25, 2024

(54) APPLICATION PROGRAMMING INTERFACE ARRANGED TO INTERFACE WITH A PLURALITY OF DATA SOURCES

(71) Applicant: Microsoft Technology Licensing, LLC, Redmond, WA (US)

(72) Inventors: Mario Lucas Pires Vaz Henriques, Oslo (NO); Christian Thuv, Oslo (NO); Niels Petter Rasch-Olsen, Oslo (NO); Helge Solheim, Oslo (NO); Andreas Eide, Oslo (NO); Jon Meling, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 15/409,464

(22) Filed: Jan. 18, 2017

(65) Prior Publication Data

US 2018/0203869 A1    Jul. 19, 2018

(51) Int. Cl.
  *G06F 16/9032*   (2019.01)
  *G06F 16/248*    (2019.01)
  (Continued)

(52) U.S. Cl.
  CPC ...... *G06F 16/90324* (2019.01); *G06F 16/248* (2019.01); *G06F 16/252* (2019.01); *G06F 16/951* (2019.01)

(58) Field of Classification Search
  CPC ........ G06F 16/38; G06F 3/067; G06F 16/951; G06F 16/958; G06F 16/90324; G06F 16/248; G06F 16/252
  See application file for complete search history.

(56) References Cited

U.S. PATENT DOCUMENTS 5,220,657 A   6/1993  Bly et al.
5,555,371 A   9/1996  Duyanovich et al.
(Continued)

FOREIGN PATENT DOCUMENTS

CN   101022396 A   8/2007
CN   101042767 A   9/2007
(Continued)

OTHER PUBLICATIONS

Steven M. Kaplan, Wiley Electrical & Electronics Engineering Dictionary 115 (2004).*

(Continued)

*Primary Examiner* — Mariela Reyes
*Assistant Examiner* — Courtney Harmon

(57) ABSTRACT

An API on a server system automatically gathers an instance of each multiple resources from different sources, storing each instance in the server system. Later, a call to the API is received from a querying application, the call comprising a search query comprising. In response, the API selects one or more of the plurality of resources as search results based on evaluating the criterion or criteria against the already-gathered instances of the resources as stored in the server system. The API returns a search response to the querying application, making the corresponding stored instances available to a consuming party In embodiments the API is "holistic" in nature, in that the search results may comprise different types of resource (e.g. file, email, task), from different types source (e.g. type of application they originate from), and/or related to the consuming part by different types of activity (e.g. used, modified shared, trending).

20 Claims, 6 Drawing Sheets

(51) Int. Cl.
  *G06F 16/25* (2019.01)
  *G06F 16/951* (2019.01)

(56) References Cited

U.S. PATENT DOCUMENTS

| | | | |
|---|---|---|---|
| 6,493,731 | B1 | 12/2002 | Jones et al. |
| 7,263,537 | B1 | 8/2007 | Lin et al. |
| 7,647,346 | B2 | 1/2010 | Silverman et al. |
| 7,730,478 | B2 | 6/2010 | Weissman |
| 8,099,463 | B2 | 1/2012 | Horowitz et al. |
| 8,181,111 | B1 | 5/2012 | Onyon et al. |
| 8,250,145 | B2 | 8/2012 | Zuckerberg et al. |
| 8,453,068 | B2 | 5/2013 | Stibel et al. |
| 8,473,607 | B2 | 6/2013 | Enscoe et al. |
| 8,479,103 | B2 | 7/2013 | DeLuca et al. |
| 8,510,379 | B2 | 8/2013 | Howes et al. |
| 8,595,381 | B2 | 11/2013 | Long |
| 8,819,236 | B2 | 8/2014 | Gkantsidis et al. |
| 8,826,407 | B2 | 9/2014 | Henderson |
| 9,128,768 | B2 | 9/2015 | Korovin et al. |
| 9,135,304 | B2 | 9/2015 | Oliver et al. |
| 9,183,514 | B2 | 11/2015 | Chavez |
| 9,208,207 | B2 | 12/2015 | Venkataramani et al. |
| 9,219,736 | B1 | 12/2015 | Lewis et al. |
| 9,276,882 | B2 | 3/2016 | Mok et al. |
| 9,286,327 | B2 | 3/2016 | Kripalani et al. |
| 9,317,574 | B1 | 4/2016 | Brisebois et al. |
| 9,378,241 | B1 | 6/2016 | Shankar et al. |
| 9,378,303 | B1 | 6/2016 | Shankar et al. |
| 9,390,159 | B2 | 7/2016 | Junkergard et al. |
| 9,396,242 | B2 | 7/2016 | Varley et al. |
| 9,406,090 | B1* | 8/2016 | Adam ............... G06Q 50/01 |
| 9,424,330 | B2 | 8/2016 | Prasanna |
| 9,465,830 | B2 | 10/2016 | Wable et al. |
| 9,588,849 | B2 | 3/2017 | Sinha |
| 9,760,446 | B2 | 9/2017 | Hammer |
| 9,779,260 | B1 | 10/2017 | Brisebois et al. |
| 9,823,978 | B2 | 11/2017 | Mutha et al. |
| 9,842,218 | B1 | 12/2017 | Brisebois et al. |
| 9,842,220 | B1 | 12/2017 | Brisebois et al. |
| 9,847,994 | B1 | 12/2017 | Kelly et al. |
| 9,910,738 | B2 | 3/2018 | Prahlad et al. |
| 9,928,005 | B2 | 3/2018 | Sinha |
| 9,940,377 | B1 | 4/2018 | Sait |
| 9,990,506 | B1 | 6/2018 | Brisebois et al. |
| 10,033,702 | B2 | 7/2018 | Ford et al. |
| 10,664,772 | B1* | 5/2020 | Poel ............... G06F 3/04842 |
| 2004/0064511 | A1 | 4/2004 | Abdel-Aziz et al. |
| 2004/0068523 | A1 | 4/2004 | Keith et al. |
| 2005/0044246 | A1 | 2/2005 | Kawabata et al. |
| 2006/0253500 | A1 | 11/2006 | Kapur |
| 2007/0156670 | A1 | 7/2007 | Lim |
| 2008/0059474 | A1 | 3/2008 | Lim |
| 2008/0177755 | A1 | 7/2008 | Stern et al. |
| 2008/0208963 | A1 | 8/2008 | Eyal et al. |
| 2008/0222108 | A1 | 9/2008 | Prahlad et al. |
| 2010/0081417 | A1 | 4/2010 | Hickie |
| 2010/0269158 | A1 | 10/2010 | Ehler et al. |
| 2011/0093471 | A1 | 4/2011 | Brockway et al. |
| 2011/0258461 | A1 | 10/2011 | Bates et al. |
| 2012/0259894 | A1 | 10/2012 | Varley et al. |
| 2013/0014040 | A1* | 1/2013 | Jagannathan ...... H04M 1/72586 715/765 |
| 2013/0066833 | A1 | 3/2013 | Aikas et al. |
| 2013/0139191 | A1 | 5/2013 | Ren |
| 2013/0155068 | A1 | 6/2013 | Bier et al. |
| 2013/0203433 | A1* | 8/2013 | Luna ............... H04W 72/04 455/452.1 |
| 2013/0225284 | A1 | 8/2013 | Lenger |
| 2013/0229429 | A1 | 9/2013 | Mi et al. |
| 2013/0262396 | A1 | 10/2013 | Kripalani et al. |
| 2013/0346414 | A1 | 12/2013 | Smith et al. |
| 2014/0114940 | A1 | 4/2014 | Prahlad et al. |
| 2014/0181048 | A1 | 6/2014 | Varadharajan et al. |
| 2014/0279893 | A1 | 9/2014 | Branton |
| 2014/0297695 | A1 | 10/2014 | Dejana et al. |
| 2014/0298207 | A1* | 10/2014 | Ittah ............... G06Q 10/00 715/753 |
| 2015/0032686 | A1* | 1/2015 | Kuchoor ............ G06F 17/241 707/608 |
| 2015/0089514 | A1 | 3/2015 | Grewal et al. |
| 2015/0120745 | A1 | 4/2015 | James |
| 2015/0124820 | A1 | 5/2015 | Alizadeh Attar et al. |
| 2015/0149410 | A1 | 5/2015 | Haon et al. |
| 2015/0149898 | A1 | 5/2015 | Worrall et al. |
| 2015/0156263 | A1 | 6/2015 | Clayton et al. |
| 2015/0163206 | A1 | 6/2015 | Mccarthy et al. |
| 2015/0169716 | A1 | 6/2015 | Franklin et al. |
| 2015/0186492 | A1 | 7/2015 | Shalita et al. |
| 2015/0186668 | A1 | 7/2015 | Whaley et al. |
| 2015/0200948 | A1 | 7/2015 | Cairns et al. |
| 2015/0215390 | A1 | 7/2015 | Yerli |
| 2015/0242466 | A1 | 8/2015 | Alexander et al. |
| 2015/0294377 | A1 | 10/2015 | Chow |
| 2015/0301903 | A1 | 10/2015 | Mutha et al. |
| 2015/0347447 | A1 | 12/2015 | Onorato et al. |
| 2015/0363270 | A1 | 12/2015 | Hammer |
| 2016/0019224 | A1 | 1/2016 | Ahn et al. |
| 2016/0021037 | A1 | 1/2016 | Hewitt et al. |
| 2016/0026704 | A1 | 1/2016 | Strong et al. |
| 2016/0055248 | A1 | 2/2016 | Goel et al. |
| 2016/0078245 | A1 | 3/2016 | Amarendran et al. |
| 2016/0179855 | A1 | 6/2016 | Roman et al. |
| 2016/0188591 | A1 | 6/2016 | Bestler et al. |
| 2016/0188599 | A1* | 6/2016 | Maarek ............ H04L 51/22 707/728 |
| 2016/0191509 | A1 | 6/2016 | Bestler et al. |
| 2016/0191618 | A1 | 6/2016 | Shi |
| 2016/0210202 | A1 | 7/2016 | Sinha |
| 2016/0224435 | A1 | 8/2016 | Kripalani et al. |
| 2016/0283085 | A1 | 9/2016 | Beausoleil et al. |
| 2016/0300141 | A1 | 10/2016 | Veeraragavan et al. |
| 2016/0359856 | A1 | 12/2016 | Wang et al. |
| 2017/0006020 | A1 | 1/2017 | Falodiya |
| 2017/0031769 | A1 | 2/2017 | Zheng et al. |
| 2017/0031773 | A1 | 2/2017 | Prahlad et al. |
| 2017/0031774 | A1 | 2/2017 | Bolen et al. |
| 2017/0039145 | A1 | 2/2017 | Wu et al. |
| 2017/0041296 | A1 | 2/2017 | Ford et al. |
| 2017/0048222 | A1* | 2/2017 | Wise ............... G06F 16/24578 |
| 2017/0052717 | A1 | 2/2017 | Rawat et al. |
| 2017/0060918 | A1 | 3/2017 | Iyer et al. |
| 2017/0131912 | A1 | 5/2017 | Sinha |
| 2017/0142094 | A1 | 5/2017 | Doitch et al. |
| 2017/0177596 | A1* | 6/2017 | Comstock ........... H04L 51/20 |
| 2017/0228387 | A1 | 8/2017 | Ahn et al. |
| 2017/0250816 | A1 | 8/2017 | Popa et al. |
| 2017/0315728 | A1 | 11/2017 | Zheng et al. |
| 2017/0315878 | A1 | 11/2017 | Purohit et al. |
| 2018/0047072 | A1 | 2/2018 | Chow |
| 2018/0081887 | A1 | 3/2018 | Ahn et al. |
| 2018/0107838 | A1 | 4/2018 | Amarendran et al. |
| 2018/0143879 | A1* | 5/2018 | Dornemann ......... G06F 16/183 |
| 2018/0173372 | A1* | 6/2018 | Greenspan .......... G06T 11/206 |
| 2018/0181314 | A1 | 6/2018 | Dhuse et al. |
| 2018/0203770 | A1 | 7/2018 | Tennoe et al. |
| 2018/0205739 | A1 | 7/2018 | Sommerfelt et al. |
| 2018/0205792 | A1 | 7/2018 | Macksood et al. |
| 2018/0219687 | A1 | 8/2018 | Popa et al. |

FOREIGN PATENT DOCUMENTS

| | | |
|---|---|---|
| CN | 102365634 A | 2/2012 |
| CN | 102999545 A | 3/2013 |
| CN | 103250161 A | 8/2013 |
| CN | 103533006 A | 1/2014 |
| CN | 104361034 A | 2/2015 |
| CN | 105025084 A | 11/2015 |
| CN | 106170972 A | 11/2016 |
| EP | 2690540 A1 | 1/2014 |
| EP | 2947848 A1 | 11/2015 |

(56) References Cited

FOREIGN PATENT DOCUMENTS

| | | |
|---|---|---|
| EP | 2947848 B1 | 7/2018 |
| WO | 2016/153676 A1 | 9/2016 |

OTHER PUBLICATIONS

Dick Pountain, The Penguin Concise Dictionary of Computing 69-70 (2003).*

"Final Office Action Issued in U.S. Appl. No. 15/409,451", dated Apr. 25, 2019, 18 Pages.

"Final Office Action Issued in U.S. Appl. No. 15/409,466", dated May 8, 2019, 11 Pages.

"Final Office Action Issued in U.S. Appl. No. 15/409,447", dated May 2, 2019, 11 Pages.

Lefferts, Rob, "Today at Connect()—introducing the Microsoft Graph", https://blogs.office.com/2015/11/18/today-at-connect-introducing-the-microsoft-graph/, Published on: Nov. 18, 2015, 5 pages.

"Android Pay—A fast, simple way to pay", Retrieved from: https://developers.google.com/pay/, Retrieved on: Jan. 4, 2017, 2 Pages.

"App authentication with Microsoft Graph", Retrieved from: https://web.archive.org/web/20170130170539/https://graph.microsoft.io/en-us/docs/authorization/auth_overview, Retrieved on: Jan. 4, 2017, 4 Pages.

Krishnanunni "Building a Social Inbox using MongoDB", Retrieved from: http://suyati.com/webinar/social-inbox-mongodb/, Retrieved on: Dec. 27, 2016, 9 Pages.

"Easily Allow a User to Access another User's Mailbox", Retrieved from: https://docs.microsoft.com/en-us/previous-versions/technet-magazine/ff381460(v=msdn.10), Retrieved on: Jan. 4, 2017, 2 Pages.

"Javascript Object Signing and Encryption (JOSE)", Retrieved from: https://jose.readthedocs.io/en/latest/, 2014, 6 Pages.

"JSON Web Tokens", Retrieved from: https://jwt.io/, Retrieved on: Jan. 4, 2017, 6 Pages.

"Knowledge Center—Extending Kaltura—Programming Using API and Plugins", Retrieved from: https://knowledge.kaltura.com/expertise/extending-kaltura-programming-using-api-and-plugins, Oct. 17, 2013, 54 Pages.

"Ldp Overview", Retrieved from: https://docs.microsoft.com/en-us/previous-versions/windows/it-pro/windows-server-2003/cc772839(v=ws.10), Mar. 28, 2003, 2 Pages.

"Microsoft Azure", Retrieved from: https://docs.microsoft.com/en-us/azure/, Retrieved on: Jan. 1, 2017, 3 Pages.

"Microsoft Graph permission scopes", Retrieved from: https://graph.microsoft.io/en-us/docs/authorization/permission_scopes, Retrieved on: Jan. 4, 2017, 10 Pages.

"Outlook Dev Center—OAuth Sandbox", Retrieved from: https://oauthplay.azurewebsites.net/, Retrieved on: Jan. 4, 2017, 3 Pages.

"Query the Office graph using GQL and SharePoint Online Search REST APIs", Retrieved From: https://developer.microsoft.com/en-us/graph/docs/api-reference/beta/resources/social_overview, Retrieved on: Jan. 6, 2017, 12 Pages.

"Tenant Isolation in Microsoft Office 365", Retrieved from: https://docs.microsoft.com/en-us/office365/securitycompliance/office-365-tenant-isolation-overview, Nov. 9, 2016, pp. 1-15.

"Non Final Office Action Issued in U.S. Appl. No. 15/409,447", dated Oct. 4, 2018, 11 Pages.

"Non Final Office Action Issued in U.S. Appl. No. 15/409,451", dated Sep. 27, 2018, 15 Pages.

"Non Final Office Action Issued in U.S. Appl. No. 15/409,466", dated Oct. 10, 2018, 12 Pages.

Altimore, et al., "Quickstart for the Azure AD Graph API", Retrieved from: https://docs.microsoft.com/en-us/azure/active-directory/develop/active-directory-graph-api-quickstart, Sep. 16, 2016, 7 Pages.

Bodriagov, et al., "Access control in decentralized online social networks: Applying a policy-hiding cryptographic scheme and evaluating its performance", In Proceedings of the IEEE International Conference on Pervasive Computing and Communications Workshops, Mar. 24, 2014, pp. 622-628.

Bronson, et al., "TAO: Facebook's Distributed Data Store for the Social Graph", In Proceedings of the USENIX Annual Technical Conference, Jun. 26, 2013, pp. 49-60.

Dubey, et al., "Weaver: A High Performance, Transactional Graph Database Based on Refinable Timestamps", In Proceedings of the VLDB Endowment, vol. 9, No. 11, Jun. 20, 2016, 12 Pages.

Ghemawat, et al., "The Google File System", In Proceedings of the 19th ACM SIGOPS Operating Systems review, vol. 37, Issue 5, Oct. 19, 2003, pp. 29-43.

Grolinger, et al., "Data management in cloud environments: NoSQL and NewSQL data stores", In Journal of Cloud Computing: Advances, Systems and Applications, vol. 2, Issue 1, Dec. 1, 2013, pp. 1-24.

Hardt, D. "The OAuth 2.0 Authorization Framework", Retrieved from: https://tools.ietf.org/html/rfc6749, Oct. 2012, 76 Pages.

Hoschek, et al., "Data Management in an International Data Grid Project", In Proceedings of the First IEEE/ACM International Workshop on Grid Computing, Dec. 17, 2000, 15 Pages.

Jones, et al., "JSON Web Token (JWT)", Retrieved from: http://self-issued.info/docs/draft-ietf-oauth-json-web-token.html, May 2015, 19 Pages.

Jones, et al., "JSON Web Token (JWT) Profile for OAuth 2.0 Client Authentication and Authorization Grants", Retrieved from: https://tools.ietf.org/html/draft-ietf-oauth-jwt-bearer-11, Oct. 21, 2014, 10 Pages.

Lamos, et al., "Azure Active Directory developer's guide", Retrieved from: https://docs.microsoft.com/en-us/azure/active-directory-developers-guide, Sep. 12, 2016, 7 Pages.

Lamos, et al., "Azure AD token reference", Retrieved from: https://docs.microsoft.com/en-us/azure/active-directory/develop/id-tokens, Jun. 10, 2016, 15 Pages.

"International Search Report and Written Opinion Issued in PCT Application No. PCT/US2018/013677", dated Mar. 16, 2018, 11 Pages.

"International Search Report and Written Opinion Issued in PCT Application No. PCT/US2018/013678", dated Mar. 28, 2018, 13 Pages.

"International Search Report and Written Opinion Issued in PCT Application No. PCT/US2018/013679", dated Mar. 20, 2018, 10 Pages.

Raykova, et al., "Privacy Enhanced Access Control for Outsourced Data Sharing", In Proceedings of the 16th International Conference on Financial Cryptography and Data Security, Feb. 27, 2012, pp. 1-15.

Wang, et al., "Achieving distributed user access control in sensor networks", In Journal of Ad Hoc Networks, vol. 10, Issue 3, Jan. 25, 2011, pp. 1-12.

"International Search Report and Written Opinion Issued in PCT Application No. PCT/US2018/013675", dated Mar. 9, 2018, 11 Pages.

"Non-Final Office Action Issued in U.S. Appl. No. 15/409,451", dated Oct. 18, 2019, 19 Pages.

"Notice of Allowance Issued in U.S. Appl. No. 15/409,447", dated Jul. 31, 2019, 8 Pages.

"Notice of Allowance Issued in U.S. Appl. No. 15/409,466", dated Jul. 18, 2019, 10 Pages.

"Examiner Initiated Interview Summary Issued in U.S. Appl. No. 15/409,451", dated Aug. 9, 2019, 1 Page.

"Non Final Office Action Issued in U.S. Appl. No. 16/936,812", dated Mar. 17, 2022, 25 Pages.

"Office Action Issued in Indian Patent Application No. 201947029675", dated Sep. 15, 2021, 8 Pages.

"Office Action Issued in Indian Patent Application No. 201947029686", dated Sep. 15, 2021, 6 Pages.

"Office Action Issued in Indian Patent Application No. 201947029671", dated Sep. 22, 2021, 7 Pages.

"Office Action Issued in European Patent Application No. 18703125.7", dated Oct. 4, 2021, 8 Pages.

"Summons to Attend Oral Proceedings Issued in European Patent Application No. 18703124.0", Mailed Date: Oct. 21, 2021, 9 Pages.

"Notice of Allowance Issued in U.S. Appl. No. 16/936,812", dated Oct. 12, 2022, 11 Pages.

"First Office Action and Search report Issued in Chinese Patent Application No. 201880007478.3", dated Dec. 5, 2022, 19 Pages.

(56) References Cited

OTHER PUBLICATIONS

"First Office Action and Search report Issued in Chinese Patent Application No. 201880007491.9", dated Dec. 5, 2022, 10 Pages.
"First Office Action and Search report Issued in Chinese Patent Application No. 201880007522.0", dated Nov. 18, 2022, 18 Pages.
"Notice of Allowance Issued in U.S. Appl. No. 16/936,812", dated Feb. 15, 2023, 10 Pages.
"Notice of Allowance Issued in Chinese Patent Application No. 201880007491.9", dated May 2, 2023, 7 Pages.
"Notice of Allowance and Search Report Issued in Chinese Patent Application No. 201880007478.3", dated Jul. 4, 2023, 10 Pages.
"Notice of Allowance Issued in Chinese Patent Application No. 201880007522.0", dated Mar. 30, 2023, 4 Pages.
"Office Action Issued in European Patent Application No. 18703124.0", dated Feb. 9, 2021, 7 Pages.

\* cited by examiner

Logical Model

---

Physical Model

APPLICATION PROGRAMMING INTERFACE ARRANGED TO INTERFACE WITH A PLURALITY OF DATA SOURCES

BACKGROUND

As the number of users and applications around the world grows, there is an ever increasing need for more and more data storage for storing various resources. These resources may include for example: files such as spreadsheets, word processing documents, slide presentations, images, videos, etc.; stored communication histories such as emails, IM chat history, etc.; user profile information such as contact details, social media profiles, etc.; and/or sites such as websites, document sharing sites, etc. Such resources may originate from a variety of applications installed on the users' terminals and/or hosted online, such as word processing applications, spreadsheet applications, social media applications, file sharing applications, etc.

Online storage has grown in popularity. Using online storage such resources can be stored online on the "cloud", meaning the resources are stored on a server system accessible via the Internet, the server system typically comprising multiple server units implemented in more than one data centre and/or geographic location. Techniques for distributed storage and processing via a network such as the Internet are known in the art.

It is also known for users to make their own resources available to other users, such as those within the same organization (e.g. company). For instance this may allow one or more other users to view the resource, subscribe to updates to the resource, or even modify the resource.

Furthermore, an application programming interface (API) may be provided that enables one application to request a resource such as a particular type of file from another application. A suite of APIs may be provided that allows a querying application to request resources from different sources (e.g. other applications).

SUMMARY

In conventional systems however, a separate individual API is required to interface to each different source and to query for each different type of resource or file (e.g. word processing, spreadsheet, email, etc.). I.e. a given API can interface only to a given source to request only a given file or resource type. Furthermore, conventional APIs are completely reactive, i.e. they only search the source for results in response to the call to the API from the querying application. This means that if a querying application makes a call to each of a suite of multiple APIs to search for resources from different kinds of source (e.g. word processing application, email client, etc.), then it has to wait for a response from each of the sources before a response including all the results can be generated.

According to one aspect disclosed herein on the other hand, there is provided a server system comprising storage for storing instances of a plurality of data resources, and an application programming interface for interfacing with a plurality of data sources each being a respective source of a respective subset of the resources. The application programming interface is arranged to perform operations of: automatically gathering a respective instance of each the plurality of resources from the respective sources, including storing each respective instance on the storage of the server system; subsequent to said gathering, receiving a call to the application programming interface from a querying application, the call comprising a search query comprising one or more search criteria; in response to said call, selecting one or more of the plurality of resources as search results based on evaluating the one or more search criteria against the already-gathered instances of the resources as stored in the storage of the server system; returning to the querying application a search response indicative of the search results; and making the instances of the resources indicated in the search response available to a consuming party through the querying application from said storage of the server system.

By pre-fetching instances of the resources into the server system, this enables a "holistic" API whereby a given search query in a given API call can solicit results from multiple different sources (e.g. multiple types of application, and/or multiple third-party systems). Further, because an instance of the resources have already been gathered together into the server system hosting the API when the API call is received, this means the results originating from the multiple resources without incurring the latency of reactively making a separate request via a separate API to each of the multiple sources of individually.

Furthermore, in particularly advantageous embodiments, the API is "holistic" in nature, in that the search results may comprise different types of resource (e.g. file, email, task, contact information, etc.); and/or resources from different types source (e.g. type of application they originate from, such as word processing application, email client, etc.); and/or resources which are related to the consuming part by different types of activity (e.g. used, modified shared, trending). In embodiments the API may search amongst the resources irrespective of the type of resource, type of source and/or type of activity. Preferably the API is agnostic as to all three factors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
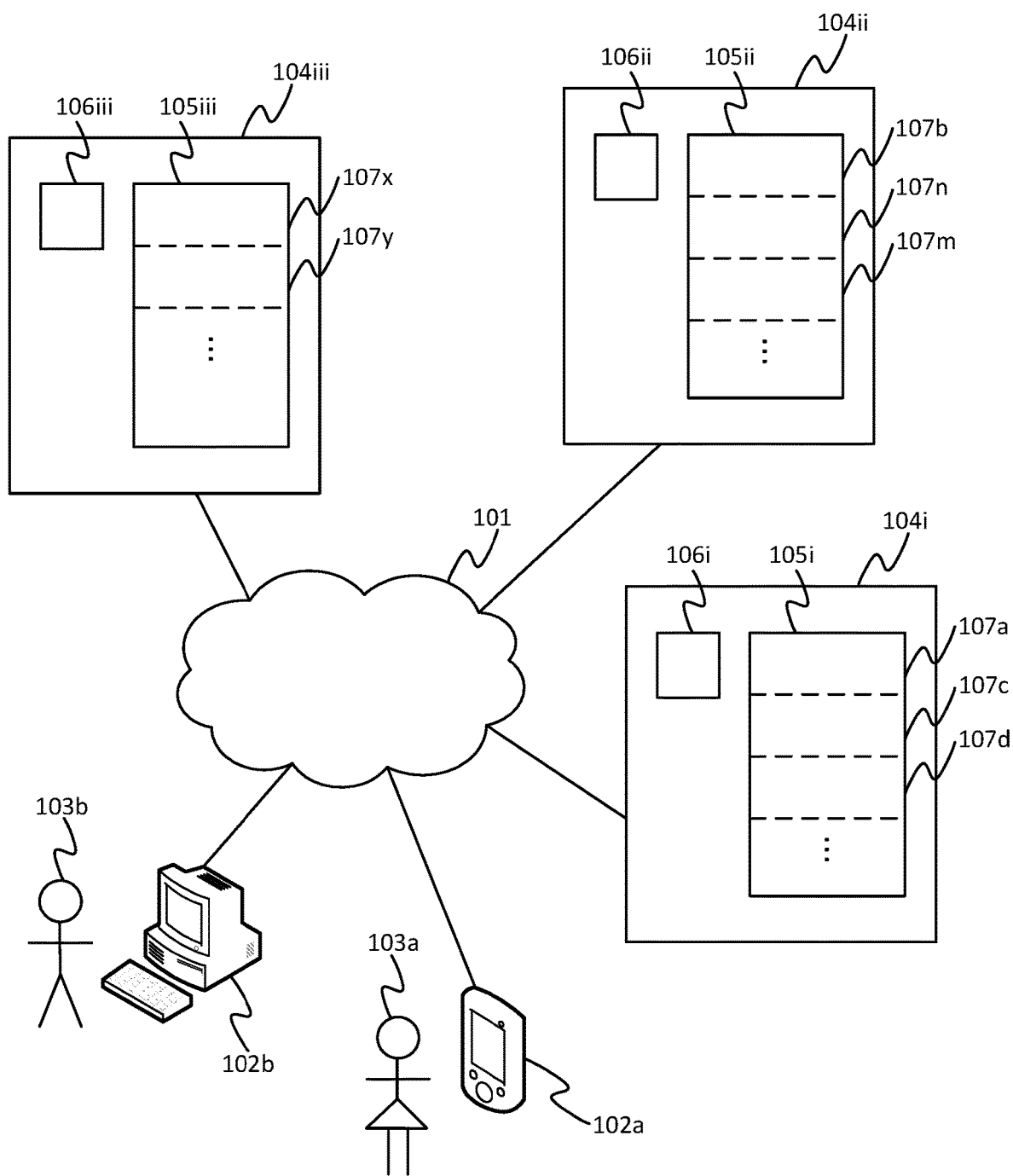
FIG. 1 is a schematic block diagram of a storage system.

FIG. 1 shows a server system in accordance with embodiments of the present disclosure. The server system comprises a plurality of server units 104, each for example being a distinct module (separate casing) on a server rack, or being located in a different room or data centre. Some or all of the server units 104 may even be located at different geographic locations, including the possibility of different towns, cities, counties, states, countries or even continents. Each server unit comprises a respective memory 105 formed of one or more memory devices, which may comprise for example one or more magnetic memory devices such as one or more hard drives and/or one or more electronic memory devices such as one or more solid state drives (SSD), or a combination of any such memory devices. By way of illustration only three server units 104i, 104ii, 104iii and their respective memories 105i, 105ii, 105iii are shown in FIG. 1, but it will be appreciated that many more may in fact be included in the system.

The server units 104 are networked together via a suitable packet-switched network 101, e.g. a wide-area internetwork such as that commonly referred to as the Internet, or a private intranet. Network may be implemented by any suitable wired and or wireless communication medium or media, e.g. the wired infrastructure of the internet, and/or one or more wireless networks such as a wireless cellular network, wireless local area network(s), etc. By whatever means implemented, the network 101 enables the server units 104 to act together to provide a distributed storage system accessible to users 103 from their respective user terminals 102 via the network 101. Each user terminal 102 may take any suitable for accessing the network 101 via a wired or wireless connection, e.g. a desktop computer, laptop computer, tablet, smartphone, smartwatch or a pair of smart-glasses (and the different user terminals do not all have to take the same form). Two particular users 103a (a first user, Alice) and 103b (a second user, Bob) and their respective user terminals 102a, 102b are shown in FIG. 1 by way of illustration, but again it will be appreciated that the system may serve many more users 103 who access the system from many respective user terminals 102.

By way of example, the server system may be arranged to provide storage services to a plurality of organizations being customers or "tenants" of the provider of the system.

Figure 4:
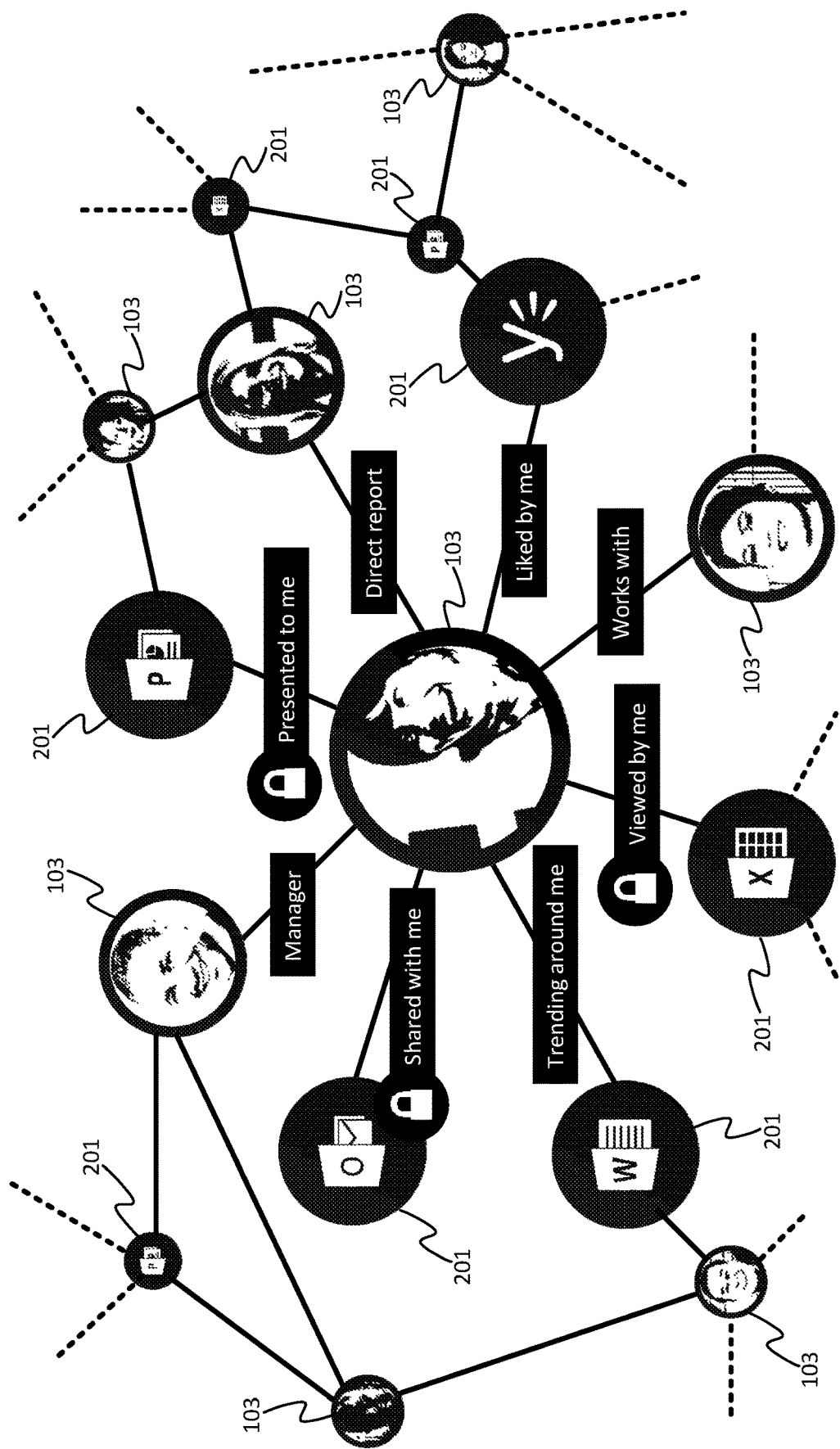

Referring also to FIG. 4, the server system stores data resources 201, where each data resources may comprise any item or collection of digital information, e.g. a file, a stored communication, user profile information, or a site of some kind. Examples of files include word processing documents, spreadsheets, slide decks, images, videos, etc. Examples of stored communications include emails, or IM (instant messaging) chat histories. Examples of user profile information include contact details (e.g. "contact cards") and social media profiles. Examples of sites include document sharing sites, websites, and collaborative sites. Anywhere where a resource is referred to herein, this may refer to any of the above-mentioned resources or others (and the different resources need not all by of the same type).

The memories 105 of the server units 104 store the resources 201 (e.g. files, emails, etc.) of the various users 103, wherein the users can make these stored resources available to others of the users within the organization to enable them perform a certain activity or activities, such as to view or modify the resources to which they have access. Where a user has access to a certain resource, the user may be described as having relationship with that resource, wherein the relationship may be qualified in terms of what activity the user is permitted to perform (e.g. view, modify) and/or the means by which the user came into contact with the resource (e.g. shared with the user, trending around the user, etc.). The server system maintains a graph of all the relationships between users and resources in the organization. The graph also records the qualities of the relationships, i.e. the manner in which the user is related to the resource (viewed by the user, modified by the user, shared with the user, trending around the user, etc.).

The graph is maintained by a manager function 106. In accordance with embodiments disclosed herein, the manager function 106 is implemented in the form of a distributed function, i.e. with a respective instance of the manager function 106i, 106ii, 106iii running on each of the server units 104i, 104ii, 104iii. Each instance of the manager function 106 takes the form of software stored on part of the memory 105 of the respective server unit 104 and arranged to run on a respective processing apparatus (not shown) of the respective server unit 104 (the processing apparatus comprising one or more microprocessors each with one or more cores). Note also that the possibility of a centralized manager function is not excluded.

Figure 3:
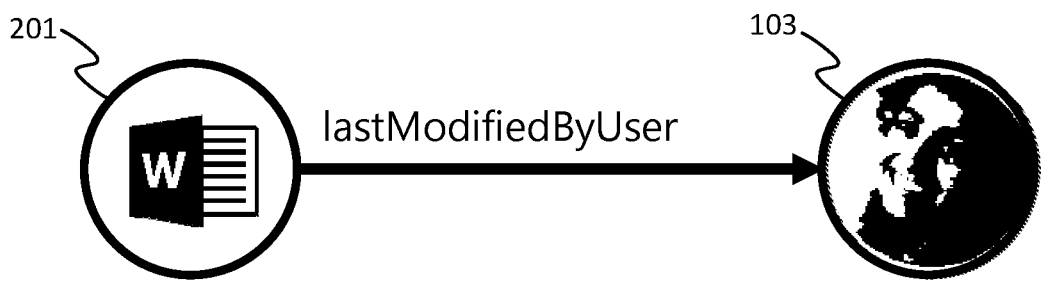
FIG. 3 is a schematic illustration of example relationships between a user and a resource, FIG. 4 schematically illustrates a graph of relationships between users and resources, FIG. 5 schematically illustrations a partitioning of the graph of FIG. 4.
Figure 3:
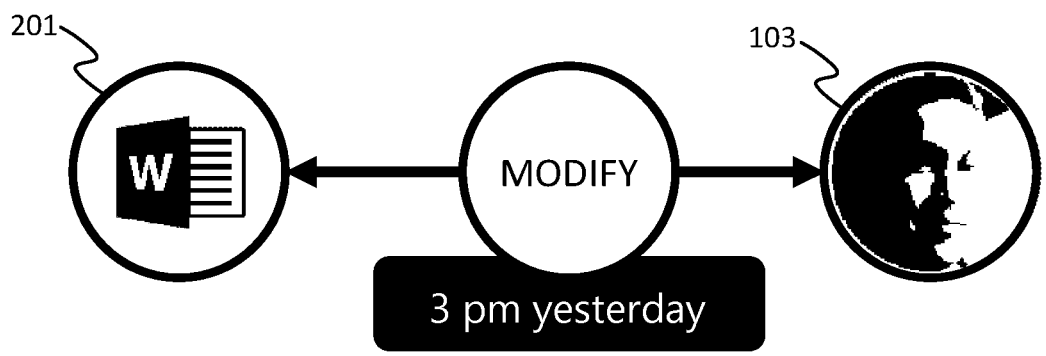
Figure 3:
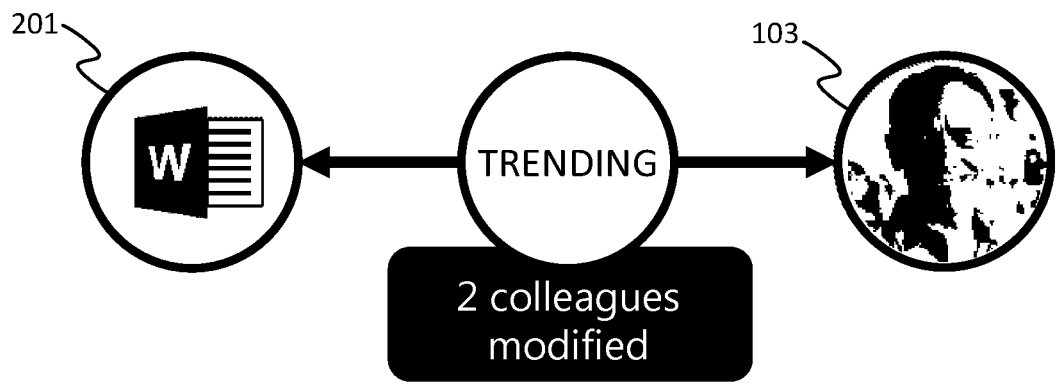

Some examples of graph relationships are illustrated schematically in FIG. 3. The top diagram in FIG. 3 illustrates an example of a basic relationship, which is a direct navigation from one object to another. That is, the relationship defines how a user 103 is related to the resource 201 in question, for instance an action the user 103 has performed in relation to the resource 201 (e.g. the fact that the resource was last modified by that user), and/or the manner in which the user 103 has come into contact with the resource 201 (e.g. shared with the user by another user). Another example of such a relationship is when the user 103 has subscribed to a given resource 201. In this case the user 103 registers with the manager function 106 to receive a notification whenever the specified resource 201 is updated by another user, and the manager function 106 automatically provides the notification when such an update occurs.

The middle diagram in FIG. 3 shows and example of a rich relationship. A rich relationship is one supplemented by metadata, and can connect to one or more objects. The metadata may for example define a time at which the user 103 performed a certain action (activity) in relation to the resource 201, such as the time at which it was last modified by that user.

The bottom diagram in FIG. 3 shows an example of an "insight". An insight is an inferred rich relationship created automatically by an intelligence layer of the manager function 106. An example of an inferred relationship is trending. Trending occurs when beyond a threshold number of pre-defined actions are detected by the manager function 106 to have been performed in relation to a given resource 201 by one or more predefined other users associated with the user 103 in question. For instance the predefined users may be the contacts of the target user 103, or users in a same group such as the same department within the organization or the same interest group. So for example, if a given resource 201 (e.g. file) has been viewed more than X times by the user's contacts or other users in a certain specified group, the resource will be declared as trending around that user.

All such information is maintained in the graph by the manager function 106, being updated when relationships are created or changed.

If the graph was to be implemented as a single organization-wide graph, then to scale a large system with many users, the graph could only grow by adding more powerful hardware, such as more powerful CPUs, more RAM etc. The presently-disclosed system provides a solution to this by instead partitioning and partially replicating portions of the graph across many per-user mailboxes, thus allowing the graph size to be scaled by adding further server units instead of upgrading the computing power of a given unit.

The graph is conceptually a global interconnected graph across an organization ("tenancy"). However, in accordance with the presently disclosed techniques it is also divided into personal, user site specific graphs with personalized views.

Referring again to FIG. 1, each of the users 103 is allocated his/her own home partition 107, or "shard", in the memory of one or the server units 104. This partition comprises a personal mailbox of the respective user. Further, the graph is divided into a personal view 501 of the graph for each user 103 (see FIG. 5), and this fragment of the graph along with the resources 201 to which the respective user 103 is related via this fragment 501 of the graph are stored in the respective mailbox 107 of that user. Where two users are related to the same resource 201, the resource is copied into the mailbox of one of the users. The primary copy of the resource 201 is stored in the mailbox of the user that owns the data, and a secondary copy is stored in the mailbox of each other user 103 having a relationship in the graph with the resource 201.

Figure 5:
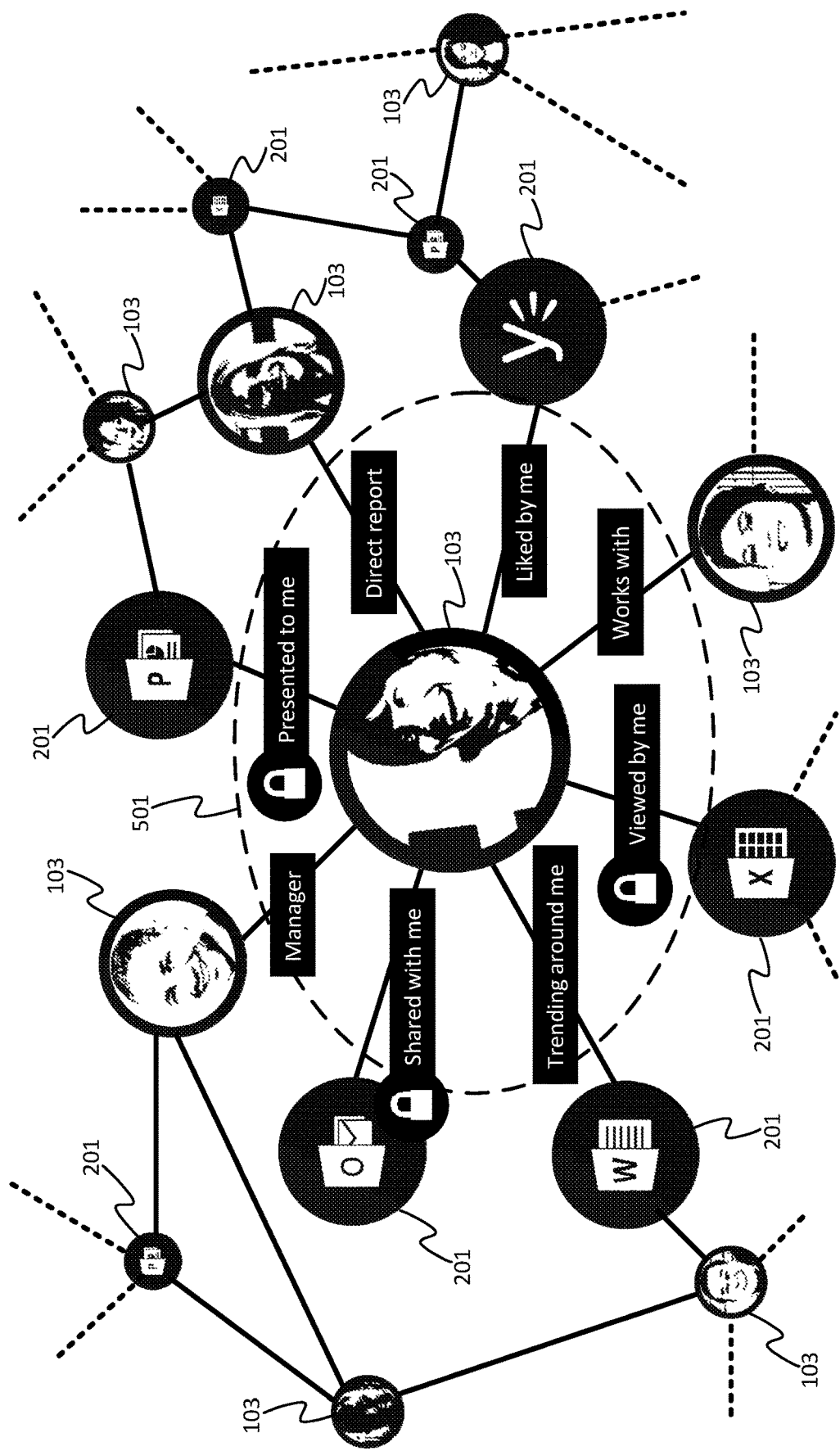

Thus, a tenant-wide graph such as that shown in FIG. 4, showing lots of users, files, other items and the user's actions on the objects, is split into mailboxes ("shards") as represented in FIG. 5.

Each of the mailboxes 107 is implemented on a physically separate respective region of memory. The mailboxes 107a, 107b of any two given users 102a, 102b may be implemented in the memories 105i, 105ii of different server units 104i, 104ii, which may be in different separately removable and replaceable physical modules in the same data centre, or different data centres, or even different geographical regions such as different towns, cities, counties, states or countries or even continents. The various server units 104 are networked together via the network 101 and controlled by the distributed manager function 106 in order to work together to provide the functionality described herein. Sometimes, the mailboxes of any two given users may happen be found in different physical regions of the memory 105 of the same server unit, but the mailboxes are still kept with distinct views 501 of the graph and distinct copies of the respective resources 201 in distinct areas of memory.

Wherever the mailboxes 107a, 107b are implemented, the manager function 106 is configured to establish a respective copy of any resource (file, email, etc.) that is common (within the graph) to more than one user 103 in each of the users' mailboxes 107.

The copy in the mailbox of the user that owns the resource is deemed the primary copy, or synonymously the "master" copy. The owner may for example be the author of the resource or the user that first introduced the resource into the system. In embodiments the manager function 106 is configured with a set of one or more ownership rules for defining who is the owner of a given resource 201 and where the master (i.e. primary) instance of each resources is to be stored (i.e. which user's mailbox 107 or "shard"). Examples of these ownership rules will be discussed in more detail shortly.

The copy in any other user's mailbox 107 is deemed a secondary copy. When any such other user wishes to access the resource such as to view the resource, they view the copy in their own mailbox 107. If there is any subsequent modification to the resource, the modification is made to the primary copy and the manager 106 is configured to then automatically propagate the modification to each secondary copy connected to the primary copy of the graph.

In contrast with the present disclosure, in conventional systems there would be only one single master instance of any given resource, whereby, if made available to other users, all users would access that same single master copy. This would suffer from the scalability issue similar to that described above. However, with a respective fragment 501 of the graph and copies of the respective resources 201 replicated across separate mailboxes 107 of each respective user 103, then each of the mailboxes can be implemented on any server unit an moved between server units 104 in a modular fashion. Hence to expand the system to accommodate more connections in the graph, the provider can simply add more server units 104 and redistribute the mailboxes 107 of different users 103 between server units 104 as necessary.

Preferably the mailbox 107 of a given user 103 is located on a server unit 104 that is located in a same geographic region as that respective user 103. If the manager function 106 is informed or detects (e.g. from persistent use of a new IP address) that the user 103 has moved home to a new geographic location, it may migrate the mailbox 107 to a new geographic location within that new geographic region accordingly. This can be readily effected because the mailboxes 107 are all modular in fashion.

Each copy in each mailbox may also comprise metadata (i.e. a "tag" or label) recording one or more properties of the resource, e.g. qualifying the relationship between the respective user and the resource, and/or some absolute property of the resource such as the last time it was modified by any user. Metadata qualifying the relationship is stored as a property on the direct object of the relationship. When the secondary copy is created, some (but not necessarily all) of the metadata from the primary copy may be duplicated in the secondary copy; and when the primary copy is modified, some (but not necessarily all) of any corresponding changes in the metadata may be propagated to the secondary copy/copies. This will be described in more detail shortly with reference to FIG. 2.

The primary copy may comprise a list defining which other users or groups of users are allowed to access the resource. I.e. not all users can necessarily obtain a secondary copy of a given resource 201—the manager function 106 may be configured to consult this list to determine whether a given other user is entitled to be connected to the resource in the graph and obtain a secondary copy in his/her mailbox.

In embodiments, the graph is limited to a given organization (e.g. company), such that user's outside the organization cannot form relationships with, nor gain access to, the resources of users within the organization. This advantageously allows the provider of the server system to provide storage services to multiple organizations without disclosure of potentially sensitive information between organizations. E.g. if the provider provides storage services to two rival cola companies, the companies would want to keep their data firmly secret form one another. However it is not excluded that in other embodiments the graph could span multiple organizations or even be global to all users.

On a point of terminology, note that the term "copy" is used herein in the sense of one of multiple instances of the same document or other such resource. "Primary copy" or "master copy" does not necessarily mean the primary or master instance is a copy in the sense of a duplicate or reproduction from some other original. The master/primary copy could be the original instance, or could be originated from an original instance stored elsewhere (not part of the graph system) such that the master copy is the master within the graph but not the ultimate original copy, and could e.g. contain just extracted text or other content from the original instance, or could include a link to the content of the original instance. "Secondary" however does mean that the secondary copy is generated from the master (primary copy).

Note also, while embodiments are described herein in terms of individual users 103, one, some or all of the mailboxes (and the copies of the resources 201 and fragment of the graph 501 stored therein) could in fact be that of a particular group of users such as a team within an organization. Hence group data such as group conversations, collaborative documents or collaborative work sites may be stored in group mailboxes, and such group content may be shared with other users or other groups. Wherever a user is referred to in this description, this could more generally be any party consisting of a single user or a defined group of users.

Further, use of the term "mailbox" in the description herein does not mean the resources 201 are limited to being emails or any other form of mail. As discussed above, the resources 201 of which primary and secondary copies are stored in the various users' mailboxes 107 may take any of a variety of forms such as files, communications, sites and/or user profile information.

In embodiments the manager function 106 uses email as the medium by which to send the data from one user's storage area 107 to another's in order to create the secondary copy from the primary copy, and/or as the medium by which to propagate changes in the primary copy to the secondary copy. This does not mean the end-user 103 receives an email, but rather the manager function 106 uses email "behind the scenes". E.g. consider the creation of a secondary copy of a resource into a mailbox 107b of a second user 103b on a second server unit 104ii from a primary copy in a mailbox 107a of a first user 103a on a first server unit 104a, or the propagation of a modification from the primary to the secondary copy. The instance of the manager function 106i on the first server unit 104i sends an email to the instance 106ii on the second server unit 104ii, the email containing the data for making the secondary copy or for propagating the change, and the receiving instance 106ii of the manager function intercepts this email and acts upon it, without the email being actually presented as a received email to the end-user 103b of the receiving mailbox 107ii. Hence in embodiments, the graph is partitioned down into email mailboxes to enable it to be implemented through an email platform. The email platform provides a persistent messaging queue for maintaining secondary copies by asynchronous messaging.

However, this is not limiting, and in other embodiments other communication media could be used, e.g. a proprietary protocol for propagating the secondary copies and modifications. For avoidance of doubt, anywhere a mailbox is referred to in the present description, this may equally be replaced with an alternate term such as "storage area", "user area", "storage compartment" or the like. In accordance with terminology introduced herein, this may also be referred to as a "shard".

Regardless of the medium by which changes are propagated, the manager function 106 implements ownership rules for determining where resources 201 are mastered, and rules for establishing and maintaining secondary copies.

The ownership rules define which user 103 is the owner of each given resource 201 and therefore whose mailbox 107 stores the primary copy. In embodiments the disclosed server system, including the manager function 106 and the graph it maintains, are configured to work in conjunction with an underlying file system operated by the provider of the server system, and/or to work in conjunction with a partner file system operated by a third party, or such like.

E.g. these could include a cloud storage service, a file sharing service or site, a collaborative document sharing site, etc. Alternatively or additionally, the server system may be configured to work in conjunction with a local file system on each of one or more of the user's user terminals 102. The ownership rules implemented by the manager function 106 by being configured to map resources in the user's local or online file libraries, accounts, and/or sites, etc. onto primary instances in the mailboxes 107 of the user 103, thereby creating a consistent mapping of nodes and relationships in a global graph down to the mailboxes 107 (or more generally storage areas or "shards").

For instance, a given user 103 may have a file library comprising one or more folders stored locally on his/her computer, or on an online cloud storage service. The ownership rules may define that any and all files in that file library, or one or more selected folders within that file library, are to have their primary instance stored in the mailbox 107 of that user 103. Any other user 103 who has access to any of those files will have a secondary copy maintained in his/her mailbox 107. As another example, a given user 103 may have an online file sharing account comprising one or more folders. The rules may define that any and all files in that file sharing account, or one or more selected folders within that file sharing account, are to have their primary instance stored in the mailbox 107 of that user 103. Again any other user 103 who has access to that one of these files will have a secondary copy maintained in his/her mailbox 107. As another example, a given user 103 may have an account on an online collaborate workspace of site comprising one or more folders, and the rules may define that any and all files in the user's workspace, site or collection of sites, or one or more selected folders within the workspace, site or sites, are owned by that user and therefore have their primary copies in that user's mailbox. Generally such ownership rules may apply to any resource repository, e.g. file library, collection of files, site, site collection, workspace, etc.

Note that where ownership or ownership rules are referred to herein, or such like, this does not necessarily mean the user is the owner in any other sense than he or she is the user having the primary copy stored in his/her mailbox (i.e. storage area) 107. For example it does not necessarily mean the user is the copyright holder. Alternatively for instance, some resources or libraries etc. may be owned in a legal sense by the organization and not to one user. Furthermore, as mentioned, anything described herein in relation to an individual user can also relate to a group of users. Hence for some resources 201, the resource 201 is not owned by an individual user even in the sense of having the primary copy stored in the mailbox of an individual user, but rather it may be stored in a mailbox "belonging" to multiple users, e.g. a team within the organization or even the organization as a whole. For these libraries, the system may create "arbitration mailboxes", i.e. mailboxes not owned by any user in particular, and may map each library (at some level) deterministically into one such mailbox.

As well as ownership rules, the manager function 106 also applies one or more further rules for creating and maintaining secondary copies. The ownership rules and/or further rules may be configured to favour performance and/or locality. For locality, the "right" objects are made available locally according to simple rules. For example, according to one preferred rule implemented by the manager function 106, every resource 201 a given user 103 ever accessed is in his/her respective mailbox 107. In embodiments, resources 201 deemed to "trend-around" that user 103 may be included in his/her respective mailbox 107 as well. The trending resources may be generated based on an activity subscription mechanism. For instance, the user gets all activity of the 40 people who he/she works the most with, and when deemed interesting locally, the related items are copied (secondary copies established) in the user's mailbox 107.

Figure 2:
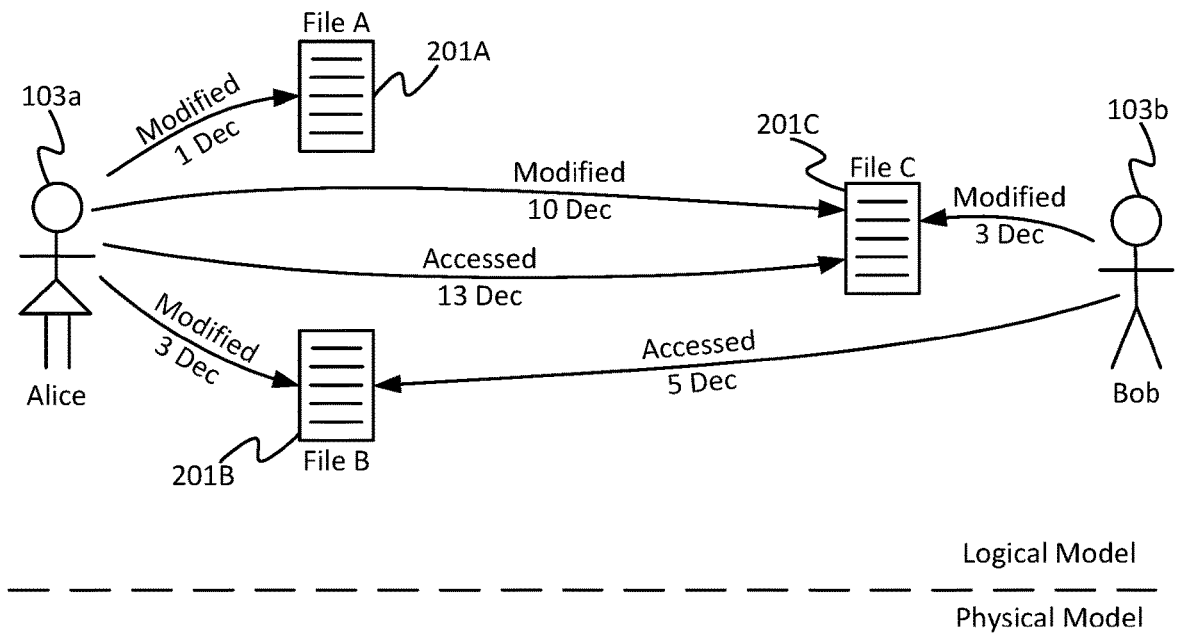
FIG. 2 is a schematic illustration of a logical and physical model of the storage system.
Figure 2:
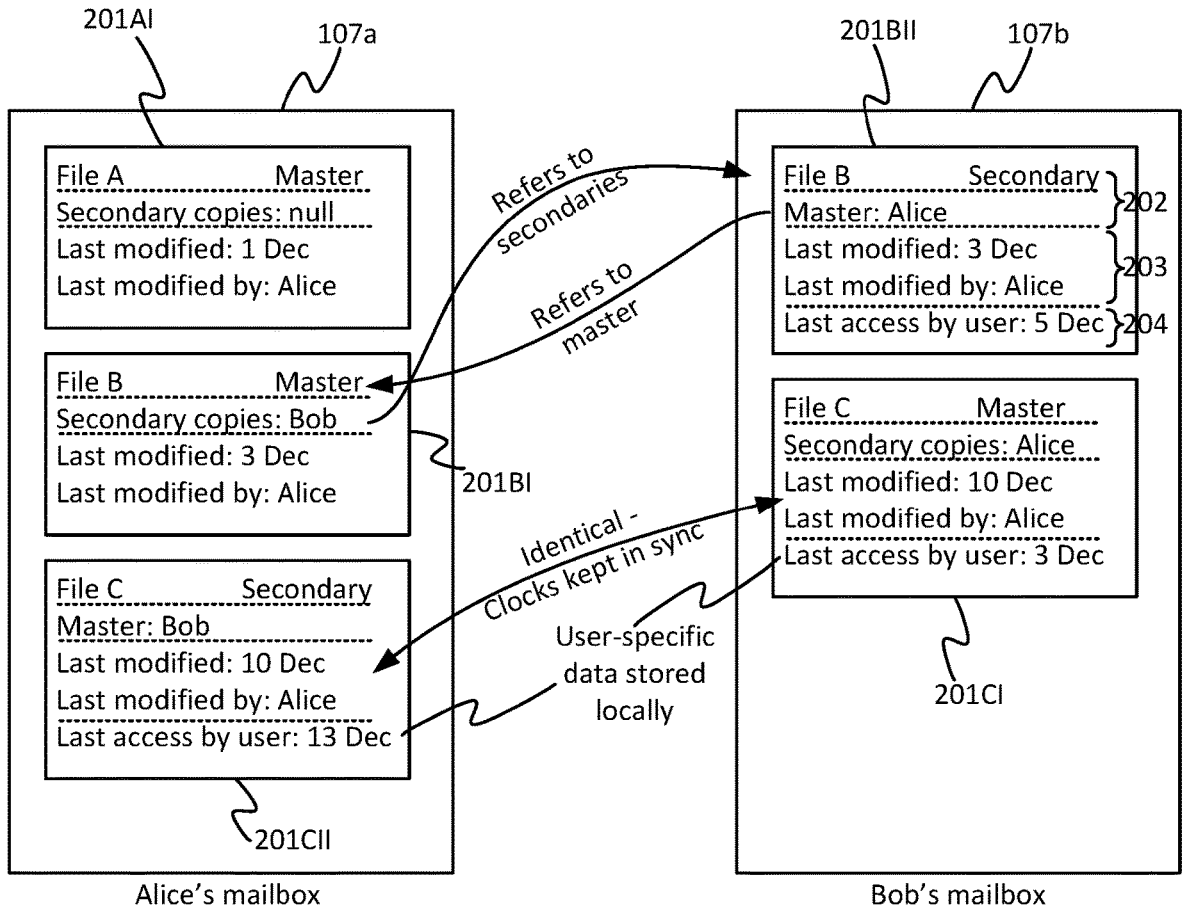

FIG. 2 illustrates a logical model and a physical model of the system, mapping from online storage libraries to mailboxes. The top diagram shows the logical model and the bottom diagram shows the physical model. FIG. 2 also illustrates examples of properties that are shared and synced across mailboxes 107, and by contrast personal properties which are specific to a given user's mailbox.

FIG. 2 illustrates these concepts by reference to an example involving a first user 103a (Alice) having a respective mailbox 107a instantiated on a first of the server units 104i, and a second user (Bob) having a separate respective mailbox 107b which may happen to be instantiated on a second of the server units 104ii. In the example shown there are three resources: a first file 201A ("File A"), a second file 201B ("File B") and a third file 201C ("File C"). It will be appreciated that in practice the mailboxes 107 may in fact store many more resources than this, and that there may also be many a more complex web of many more relationships involving many more users. Also the resources are not limited to files. This particular example of the two users and three files is given only by way of illustration.

File A and File B belong to Alice. Hence the master (primary) copy 201AI, 201AII of each of File A and File B are each stored in Alice's mailbox 107a. File C belongs to Bob and hence the master (primary) copy 201C1 is stored in Bob's mailbox 107b. At some point Alice has had been connected with File B, for example Alice shared File B with Bob, or Bob received a notification about File B as a result of a subscription (e.g. because it was trending, or because Bob has subscribed to all content from Alice, or searched for content from Alice, etc.). In response the manager function 106 automatically creates a secondary copy of File B in Bob's mailbox 107b.

Similarly, at some point Alice has come into contact with File C, Bob's file. Again this could for example be because Bob shared File C with Alice, or because of a subscription that Alice has notifying her of content from Bob, or as a result of a search query, etc. In response, the manager function 106 automatically creates a secondary copy of File C in Alice's mailbox 107a.

Note that in embodiments the system allows another user other than the owner to modify a resource 201, e.g. to make changes to a document despite the fact that he/she is not the author. In this case the other user modifies the primary copy 201I, i.e. the owner's copy, and the manager function 106 then propagates the modification back down to the other user's mailbox 107. So if Alice authored or published File B, Bob can edit it, in which case he edits the primary copy 201B in Alice's mailbox 107a, and then the edits are propagated back to his secondary copy on his own mailbox 107b. When Bob views File B however, he views the local, secondary copy from his own mailbox 107b.

In embodiments further, one or both of the primary and secondary copies 201I, 201II of any given resource could be absolute copies. That is, the actual data content of the file is stored explicitly (i.e. directly) in the respective mailbox 107 itself (as opposed to being stored in the form of a link). However, an alternative possibility is that one or both of the primary and secondary copies 201I, 201II of any given resource could be "shallow" copies. A shallow copy is a copy that is stored in the respective mailbox 107 in the form of a link, linking to the actual data content of the resource stored elsewhere, e.g. externally to the server system (e.g. a third party server). Note therefore that the term "copy" as used herein does not necessarily refer to a full duplication of the actual data content of a resource, and could also refer to a copy stored in the form of a link. In one particular example, one, some or all of the primary copies 201I could be stored as absolute copies, and the respective secondary copies could be stored as shallow copies linking to the absolute primary copies. As another example, one some or all of the primary copies themselves could be shallow copies linking to the content of the respective resource as stored elsewhere, such as an online file system. For example the ultimate source to which the primary copy links could be an underlying online cloud file system or file sharing service run by a provider of the server system, or a third-party file sharing or cloud-storage service.

Irrespective of whether the content of the resource 201 is stored in absolute terms or as a shallow copy, each of the primary and secondary copies 201I, 201II comprises metadata.

The metadata comprises at least a first portion of metadata 202, which may be referred to as connecting metadata. This metadata 202 specifies whether the copy is a primary (i.e. master) copy or a secondary copy, and if it is a primary copy what secondary copies there are (if any), or if it is a secondary copy then which is the primary copy. E.g. the former may be specified in terms of which user(s) 103 have a secondary copy (if any), and the latter may be specified in terms of which user 103 owns the primary copy. This metadata is preferably always stored in absolute terms (i.e. directly/explicitly) on the respective mailbox 107 itself (i.e. not in the form of a link), regardless of whether the content of the resource is stored in absolute terms or shallow form.

The metadata may also comprise common metadata 203 which is common across all primary and secondary instances 201I, 201II of the same resource 201. An example is the last time or date when the resource 201 was modified by any user, the identity of the last user to modify the resource 201, the title of the resource 201, and/or the file size. This information is the same regardless of whose mailbox 107 the copy is in. Hence this metadata could be stored in absolute terms or shallow form.

Alternatively or additionally, the metadata may comprise personal metadata 204 (personal in the sense that it is specific to a particular user, not necessarily in the sense of being private). An example is the last time or date when the resource 201 was modified by the particular user 103 whose mailbox 107 the particular copy in question is stored in (so the last time modified by Bob in the case of the secondary copy of File B, for instance). Such metadata is specific to the individual user 103 whose mailbox 107 the copy is stored in. Hence this metadata is preferably always stored in absolute terms (i.e. directly/explicitly) on the respective mailbox 107 itself (i.e. not in the form of a link), regardless of whether the content of the resource is stored in absolute terms or shallow form.

The reference numerals for the different portions of metadata 202, 203, 204 are only shown against the secondary copy of File B (201BII) in FIG. 2, but it will be understood that similar metadata maybe present in each instance of each file or resource.

As some of the metadata is shared between different instances of the same resource 201, whereas some is specific to the particular copy 201I, 201II, then the manager function is configured to treat the two different categories of metadata differently when establishing a secondary copy 201II, and also to treat the two different categories of metadata differently when propagating modifications from the primary copy 201I to the secondary copies 201II.

That is, when the manager function 106 makes a copy of the primary copy 201I of a resource 201 from the owner's mailbox 107, copied into the mailbox of the other user(s) 103, then the manager function copies over only the common metadata 203, i.e. the metadata that is common across different instances 201I, 201II of a given resource 201. The connecting metadata 202 and the personal metadata 204 will be specific to the particular secondary copy 201II, and hence the manager function 106 will instead create dedicated values of these metadata element for the particular secondary copy 201II currently being created.

Furthermore, when the manager function 106 propagates a modification of the primary copy 201I of a resource 201 from the owner's mailbox 107, being propagated to the mailbox(es) 107 of the other user(s) 103, then the manager function 106 propagates only the modification to the common metadata 203, i.e. again the metadata that is common across different instances 201I, 201II of a given resource 201. As the connecting metadata 202 and the personal metadata 204 are specific to each particular secondary copy 201II, the manager function 106 will not overwrite the values of these metadata values in secondary copies 201II when propagating changes.

By way of example, consider File B shown in FIG. 2, of which Alice is the owner and Bob has a secondary copy 201BII. The metadata 203 indicating when the resource was last modified (globally) is common to both the primary copy 201BI and the secondary copy 201BII. When File B is modified (e.g. by Alice), on 3 December, this new value of this common data is propagated through the graph to all secondary copies including Bob's secondary copy 201BII. On the other hand, the metadata 204 indicating when the resource was last accessed specifically by Alice is locally relevant only to Alice's own mailbox 107a, and the corresponding value of that metadata 204 indicating specifically when Bob last accessed the resource is relevant only to Bob's own mailbox 107b. Hence when File B is modified, e.g. by Alice, this change is not propagated through to Bob's mailbox 107b. Or if Bob modifies File B, the personal last-modified value is not modified in Alice's personal metadata 204 on the primary copy.

When storing a relationship between a user (actor) and a document (direct object), the manager function stores that relationship as part of the document in the actor's shard. Thus there is provided an "in-lined" storage of relationships on the direct object. The actor is the actor of the relationship, and the user whose copy the relationship is stored in.

For instance the set of possible relationships may comprise one or more of: AccessAction (the actor has viewed the document), ModifyAction (the actor has edited the document), LastAccessed (the time and/or date the resource was last accessed by the actor), LastModified (the time and/or date the document was last modified by the actor), TrendingAroundWeight (the document trends around the actor with a certain weight), and/or ReuseWeight (the likelihood of the user to reuse part of the document).

The time or date on which a resource 201 was last accessed or last modified by a given user 103 is an example of a rich relationship, i.e. the record of the relationship in-lined in the metadata comprises at least one parameter qualifying the action (in this case the date on which the action was performed).

TrendingAroundWeight and ReUseWeight are examples of inferred relationships. The trending weight is a score which quantifies how much a given resource is trending around a given user, e.g. Alice. The manager function 106 is arranged to detect this based on signals from people working closely around Alice who are viewing and/or modifying the resources. The people from whom signals are taken to determine whether a resource 201 is trending "around" a certain user 103 may be a specific subgroup of other users, e.g. a list of contacts, colleagues or friends. The re-use weight is a measure of how likely resource 201 (e.g. document) is to be cited in another resource. The manager function 106 can detect this based on its visibility of the other resources in the system.

The manager function 106 is configured to accept a search query from any of the user terminals 102, each search query including at least one search criterion. The search criterion or criteria may for example specify a certain searched for value or range of values for one or more elements of the metadata 202, 203, 204.

For instance, according to embodiments disclosed herein, the manager function 106 may be configured to accept a value or range for one or more of the elements of personal metadata 204 as a search criterion or criteria. E.g. Alice wishes to search for a certain document. As a search criterion she may search for all documents that were last accessed by her (specifically by her, not just any user) on a certain specified date or within a certain specified date range. In response, the manager function 106 returns all the resources 201 accessed by Alice on the date, or within the date rate, specified in the personal metadata 204. A similar search could be performed based on the last modified date.

Also, the search need not be performed by Alice herself. Rather, a user could search for resources 201 based on the personal metadata of another user. So e.g. Bob could search for all documents accessed or modified by Alice on a certain date or in a certain date range, or vice versa.

As another example of using personal metadata 204 for searching, the search may be based on an inferred relationship. For instance Alice may search for all resources 201 trending around her, or another user may search for all resources 201 trending around Alice.

Figure 6:
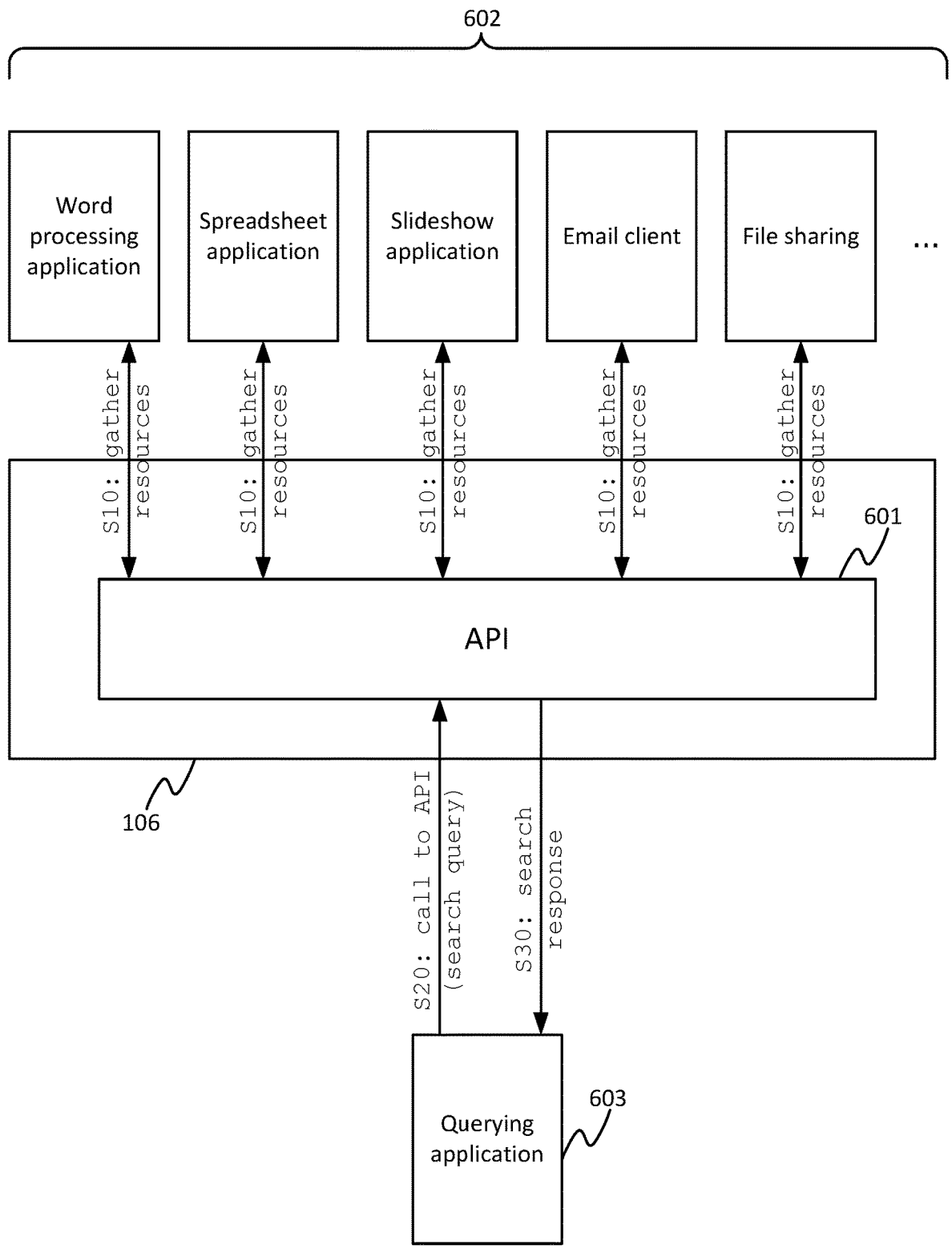
FIG. 6 is a schematic block diagram showing operation of an application programming interface.

As illustrated in FIG. 6, to facilitate the search functionality, the manager function 106 comprises an application programming interface (API) 601. In embodiments where the manager function 106 takes the form of a distributed function, the API 601 also takes the form of a distributed API, comprising a respective instance of itself in each respective instance of the manager function 106i, 106ii, 106iii . . . implemented on each of the server units 104i, 104i, 104iii . . . . Alternatively it is not excluded that the API 601 could be implemented in a centralized form comprising a single centralized instance. Either way, like the rest of the manager function 106, the API 601 is implemented in the form of software stored on any suitable storage medium or media of the server system (e.g. magnetic memory such as a hard disk, and/or electronic memory such as a SSD) and arranged to run on one or more processing units of the server system (e.g. one or more single or multicore microprocessors). The API 601 is configured so as, when thus run, to operate in accordance with the following.

FIG. 6 shows the steps carried out by the API 601 in accordance with embodiments disclosed herein. Particularly, in accordance with the presently disclosed techniques, the API 601 is arranged to systematically pre-gather potential search results into the server system prior to receiving a call to the API 601. Hence at step S10, the API 601 accesses a plurality of sources 602 of resources 201, e.g. a plurality of applications.

In embodiments, the sources 602 comprise a plurality of different types of applications, e.g. a word processing application, spreadsheet application, slideshow application, drawing application (such as a diagramming or vector drawing application), an email client, an instant messaging (IM) client, a VoIP client, a calendar application, a file sharing application, a collaborative workspace application, and/or a social media application. The different applications may be hosted by one or more other server units or server systems of the provider of the server system hosting the graph storage described herein, or by one or more third-party server units or server systems of one or more third-party applications providers, or a combination of these. Alternatively or additionally, one, some or all of the applications 602 may be installed on a user terminal 102, such as the user terminal that will initiate the search query or the user terminal of the user on behalf of whom the search query will be submitted (see step S20 below). The resources 201 in question may comprise a plurality of file types, e.g. word processing documents, spreadsheets, slideshows, drawing files (such as vector drawing files), images and/or videos; and/or a plurality of other types of resources, e.g. emails, conversation histories, calendar events, tasks, file sharing sites, workspace sites, and/or user profiles (such as contact cards), etc.

Whatever the sources 602 may be, the API 601 imports instances of the resources 201 into the storage 105 of the server system. Preferably, this involves establishing the primary and secondary copies of the various resources in the mailboxes (or storage areas) 107 of the one or more server units 104 in accordance with the techniques described herein. For instance, this may be done in accordance with the previously-described ownership rules. In embodiments, the primary and/or secondary copies may be shallow copies as also described above. Further, by whatever means implemented, the gathering of the resources at step S10 also comprises gathering metadata of the respective resources 201, e.g. metadata describing one or more actions performed on the resource 201, and/or describing a relationship between one or more users 103 and the resource 201. For instance, the relationship described by the metadata may be that the user in question has performed a certain activity on the resource such as to view or modify it; or that one or more other users related to that user (such as contacts, friends or colleagues) have performed such an action on the resource). The latter is useful for discovery purposes, i.e. to assist the user in finding resources that may be relevant to him/her.

Such metadata include common metadata 203 and/or personal metadata 204, such as the various metadata elements described above. The gathered metadata could already be included in the resource, or may be determined and added to the instance stored in the server system by the API 601 as part of the gathering process.

Note that step S10 in FIG. 6 is not necessarily meant to represent that all the resources 201 are gathered at the same time. Rather, the requests by the API 201 to access the various resources to bring them into the server system may take differing amounts of time to complete. Also, the gathering is preferably not a one-off event but an ongoing process.

At some subsequent time, at step S20, after various resources 201 have already been gathered at step S10, a querying application 603 makes a call to the API 601. The search query made in the call to the API 601 may be initiated manually by a user 103 of the querying application 603, or may be initiated on behalf of the user 103 automatically by the querying application 603 itself. The querying application 603 may be installed on the user terminal 102 of the user making the query or on behalf of whom the querying application automatically makes the query, or it may be hosted online and accessed from the user terminal 102. In the latter case, the querying application 603 may be hosted by one or more other server units or server systems of the provider of the server system hosting the graph storage described herein, or by one or more third-party server units or server systems of one or more third-party applications providers.

By whatever means initiated, the call to the API 601 comprises a search query comprising one or more search criteria. For instance the search criteria may request all resources accessed or modified at a specified time, on a specified date or within a specified time and/or date range. As another example the search criteria may request all resources trending around a specified user (e.g. the user of the querying application 603 or another user with whom that user has an association).

In response to the search query, the API 601 evaluates the one or more search criteria in relation to the various resources 201 that have already been instantiated into the server system at step S10 as described above. In embodiments, this involves comparing the value or values of the one or more search criteria to the value or values of the one or more elements of metadata, as described previously. Based on this, the API 601 identifies one or more search results, i.e. one or more of the searched resources 201 that match the search query.

At step S30 the API 601 returns a search response to the querying application 603, the search response comprising an indication of the search results. This causes the querying application 603 to output the returned indication of the search results to the user 103 (i.e. the user who initiated the query or on behalf of whom the query was submitted), the search results being output through a user interface of the querying application 603. Further, the API 601 enables this user to access the resources 201 indicated in the search results via the user interface of the querying application 603, such as to view and/or modify those resources.

Note: where it is said that step S10 is performed prior to the call to the API 601 at step S20, or such like, this does not necessarily mean it is only performed once prior to all possible calls to the API 601. Rather, in embodiments, the gathering of the results is performed in an ongoing fashion. I.e. at the time of the call S20 to the API 601, the search is performed with access to all the resources 201 gathered to date, but subsequently the system may still update its resources in an ongoing manner including to gather further resources 201 (and/or update existing resources), and then a subsequent search query in a subsequent call to the API 601 may be received and processed, and so forth.

As an example use case, the querying application 603 may take the form of a dedicated search application designed for searching multiple kinds of resources from multiple kinds of applications. Alternatively the querying application may take the form of an application having a primary function other than searching, but with a search feature included. For instance, as another example use case, the querying application 603 may take the form of a communication client application such as an email or IM client. When the user 103 selects another user in the email or IM conversation, this may summon an indication of various resources associated with that other user, e.g. documents authored, modified and/or viewed by them, and/or resources trending around that user. Note also that the search query does not necessarily have to be initiated by entering text into a conventional search field, or even initiated explicitly by the user of the querying application 603 at all. For instance the user hovers over the name, username or address of the another user in an email or IM conversation, and this automatically summons a contact card including an indication of various resources associated with that other user (e.g. again authored, viewed and/or modified by that user, and/or trending around that user).

The API 601 may be described as a "holistic" API in that, in response to a single search query made in a single call to the API 601, the API 601 searches and returns results from amongst multiple different types of resource 201, from multiple different sources (e.g. multiple different types of application), and/or having multiple different types of relationship with the user 103 of the querying application 603 (assuming those factors are not specified in the search query as one of the search criteria). Thus there are up to three "dimensions" to the holistic nature of the API 601, and one, two or three of which may be present in any given embodiment. For instance, referring to one of the above example use cases: selecting or hovering over a target user's name, username or address in an email, IM conversation or other communication may show resources 201 of different types (e.g. files, past communications, sites, etc.); resources 201 from different types of source (e.g. word processing application, email client, IM client, file-sharing service, etc.); and/or resources 201 related to the target user by different types of activity (e.g. viewed by, modified by, shared with, shared by, trending around, etc.); and preferably all three.

According to the first dimension of holisticness, the single search request S20 is not specific to the type of resource 201, and in response the API 601 searches amongst multiple different types of resource 201 (e.g. multiple file types such as word processing documents, spreadsheets, slideshow, etc.; and/or other resource types such as stored communications, sites, contact information, etc.) irrespective of the resource type.

According to the second dimension of holisticness, the search request S20 is not specific to the type of source 602, and in response the API 601 searches amongst multiple different types of resource 201 (e.g. multiple applications types such as word processing application, spreadsheet application, slideshow application, drawing application, file sharing application, collaborative workspace application, social media application, etc.) irrespective of the application type.

According to the third dimension of holisticness, the search request S20 is not specific to the nature of the relationship between the user 103 of the querying application 603 and the resources 201 being searched. In response the API 601 searches amongst the resources 201 irrespective of the relationship. In particularly preferred (but not essential) embodiments, the different types of relationship comprise different types of user activity. The different types of activity may for example include: the resource 201 was last used (e.g. last viewed or last modified) by the user 103 of the querying application 603; the resource 201 is trending around the user 103 of the querying application 603; and/or, the resource has been used by one or more other users having a predetermined association with the user 103 of the querying application 603 (e.g. one or more contacts, colleagues or friends of the user 103 of the querying application 603), such as trending around the one or more other users.

Note: the API features disclosed herein are also applicable to other storage models and not restricted to the context of the graph-based approach or per-user partitioning discussed above. Also, they can apply to searches based on other search criteria, not just based on metadata such as last modified or the like. E.g. the search could also be based on the content of the resource, such as to search for certain content resources regardless of whether included in files, communications or sites, or whether included in word processing documents, slideshows or emails, etc.

The above has described a holistic API for derived insights across entities 201 and user activity. Traditionally, a user finds difficulty in looking up any entity (such as Documents, mails, task, contact, sites etc.) from multiple sources and user activities performed on the entities at a one location. To address this the present disclosure provides an API 601 that discloses advances features and user activity performed on various entities (e.g. documents) hosted in several source systems and used across systems. The API 601 may be the output of multiple ingestion and machine learning processes.

The API surface gives a holistic insight into entities (documents, emails, tasks, contacts, etc.) available to a given user. The API 601 is holistic in that it gives insights into various aspects of resources 201 for a user 103, such as the following. SHARED: these are resources that have been shared using a variety of mechanisms, such as data that has been actively, explicitly and/or implicitly shared with the user. USED: these are resources that the user or some other user associated with the user has used in one form or another, e.g. MRU (most recently used), modified, accessed, tagged, liked etc. DISCOVERY: other resources that for some reason the user might want to look at, e.g. because his/her peers have performed miscellaneous actions on the resources, i.e. data that other people worked on and that may be relevant to the user.

With regard to SHARED, by using the single API 601, it is possible to find all resources that have been shared with the user in question, filtered for example by when shared, who shared it, how it was shared (email, file sharing service, etc.); and/or all resources that the user has shared with others, filtered on similar properties.

The API 601 addresses issues such as how to view entities from many sources in one location; how to look at activity that has happened on resources, independence of what application was used to perform the activity; and/or how to find entities based on actions performed on these entities (e.g. find all entities that the user has modified recently, or find all entities that have been shared with the user).

In addition to the API surface, in embodiments, mechanisms used to make the data available in a substrate may include: a mechanism to make the data available to the API surface by using metadata representation of resource, capturing user activity from different sources, and using rules for transforming user activity into the API surface (done at write time for efficiency, but could be calculated at read-time). Any such factors or others may be stored as additional metadata on the resource.

Further, using the API 601 it is possible to move the original data source and retrieve more information from the resource there. I.e. the search results contain a reference, typically a URL, pointing to the original data, e.g. the file in the source system.

Data entity references make it possible to reference data into one system from another, e.g. links to documents in emails. User activity may include users performing views, edits, hashtagging, or such like, on the above data entities.

Further, shallow copies of entities may be used, and all interesting entities may have shallow copies in a substrate (i.e. the back-end). Also, activity enrichments may be provided on the entities, e.g. when interesting activity happens, a process gathers the activity and sends it to the back-end. Analytics jobs in the back-end write activity on the shallow copies of the entity, thereby enriching the entity itself with the activity. To retrieve activity from multiple systems, from several users, one single API is provided on top of the back-end substrate service that returns the relevant subset of information. The single API provides a holistic view of activity and content, pivoted on either a person (the user or others) or a resource (document, email, list item, person, site, group, item in general, etc.).

For example, by selecting a person, the user can see: DISCOVERY information, such as all resources that person is mentioned in, all resources that person has hashtagged, and/or all resources that other people that person works with have modified, liked and/or accessed a lot lately ("trending"); SHARED information, such as all resources that person has shared with the user or has been shared with that person by the user, and/or all resources that person has presented to you or the person has presented to the user, e.g. live in a VoIP service, or such like; and/or USAGE information, such as all resources the person has modified, all resources the person has accessed or viewed (if the person is the user or views are not private), and/or all resources the person has liked.

It will be appreciated that the above embodiments have been described by way of example only.

More generally, according to one aspect disclosed herein there is provided a server system comprising storage for storing instances of a plurality of data resources, and an application programming interface for interfacing with a plurality of data sources each being a respective source of a respective subset of the resources, wherein the application programming interface is arranged to perform operations of: automatically gathering a respective instance of each the plurality of resources from the respective sources, including storing each respective instance on the storage of the server system; subsequent to said gathering, receiving a call to the application programming interface from a querying application, the call comprising a search query comprising one or more search criteria; and in response to said call, selecting one or more of the plurality of resources as search results based on evaluating the one or more search criteria against the already-gathered instances of the resources as stored in the storage of the server system; returning to the querying application a search response indicative of the search results; and making the instances of the resources indicated in the search response available to a consuming party through the querying application from said storage of the server system.

In embodiments, said plurality of sources may comprise a plurality of target applications other than the querying application, the target applications including a plurality of applications of different types to one another.

In embodiments, the plurality of different types of applications may comprise any two or more of: word processing application, spreadsheet application, slideshow application, drawing application, email client, IM client, VoIP client, calendar application, collaborative workspace application, social media application, and/or file sharing application.

In embodiments, the application programming interface may be configured so as, if the search query does not specify the type of application as a search criterion, then in response to search amongst multiple different ones of said types of application for inclusion in the search results.

In embodiments, said plurality of resources may comprise different types of resource.

In embodiments, the plurality of different types of resource may comprise any two or more of: files, stored communications, calendar events, tasks, sites, and/or user profile information.

In embodiments, the application programming interface may be configured so as, if the search query does not specify the type of resources as a search criterion, then in response to search amongst multiple different ones of said types of resource for inclusion in the search results.

In embodiments, some or all of the resources may comprise a plurality of files, and the files may comprise different types of file.

In embodiments, the different types of file may comprise any two or more of: word processing document, spreadsheet, slideshow, vector graphic drawing, image and/or video.

In embodiments, the application programming interface may be configured so as, if the search query does not specify the type of file as a search criterion, then in response to search amongst multiple different ones of said types of file for includes in the search results.

In embodiments, each instance in the storage of the server system is stored in a form comprising a first portion and metadata, the first portion either comprising a duplication of the content of the resource stored in said storage of the server system or comprising a link to the resource stored elsewhere, and the metadata describing a relationship between the resource and the consuming party; and the application programming interface may be configured to select which of the resources to include in the search results based on an evaluation of the one or more search criteria against the metadata.

In embodiments, the relationships described by the metadata in the instances of different ones of the resources comprise different types of activity performed on the respective resource by the consuming party or one or more other parties associated with the consuming party, the different types of activity comprising any two or more of: the resource having been previously used by the consuming party; the resource having been shared with the consuming party by one or more other parties; the resource having been shared by the consuming party with one or more other parties; and/or the resource having been used by one or more other users associated with the consuming party, thereby enabling the consuming user to discover resources used by the one or more other users.

In embodiments, the application programming interface may be configured so as, if the search query does not specify the type of activity as a search criterion, then in response to select to include in the search results resources related to the consuming user by multiple different ones of said types of activity.

In embodiments, said one, some or all of the sources may be provided by a provider of said server system but are hosted elsewhere within said server system.

In embodiments, one, some or all of the sources may be third-party sources outside of said server system.

In embodiments, at least some of said sources may be comprised by different server units to one another, the different server units being implemented in separate housings, racks, rooms, buildings or geographic locations.

In embodiments said storage may comprise a separate storage area for each of a plurality of parties; said gathering may comprise storing a primary instance of each of said plurality of resources in the respective storage area of a respective one of the parties associated with the resource, and for at least some of the resources where a respective second party has formed a relationship with the respective resource, additionally storing a respective secondary instance of the resource in the storage area of the respective second party; and the application programming interface may be configured so as, if the consuming party is the second party, then to perform said evaluation of the one or more search criteria against the respective secondary instances, the instances being made available to the respective second party being the respective secondary instances.

In embodiments, each of the secondary instances may be stored in the storage area of the respective second party in a form comprising a first portion and metadata, the first portion either comprising a duplication of the content of the resource stored in said storage of the server system or comprising a link to the resource stored elsewhere, and the metadata describing an action performed on the resource by the second party and/or a relationship between the resource and the second party; and the application programming interface may be configured to select which of the resources to include in the search results based on an evaluation of the one or more search criteria against the metadata of the second party included in the secondary instances.

In embodiments, at least some of the separate storage areas, including at least the respective storage areas of the first and second parties, may be implemented on separate server units in separate housings, racks, rooms, buildings or geographic locations.

According to another aspect disclosed herein, there is provided a method of storing instances of a plurality of data resources, the method comprising: providing an application programming interface for interfacing with a plurality of data sources each being a respective source of a respective subset of the resources; the application programming interface automatically gathering a respective instance of each the plurality of resources from the respective sources, including storing each respective instance on the storage of the server system; subsequent to said gathering, receiving a call to the application programming interface from a querying application, the call comprising a search query comprising one or more search criteria; and in response to said call, the application programming interface selecting one or more of the plurality of resources as search results based on evaluating the one or more search criteria against the already-gathered instances of the resources as stored in the storage of the server system; wherein the application programming interface returns to the querying application a search response indicative of the search results, and makes the instances of the resources indicated in the search response available to a consuming party through the querying application from said storage of the server system.

In embodiments the method may comprise operations corresponding to any of the above system features.

Other applications and variants of the techniques disclosed herein may become apparent to a person skilled in the art once given the present disclosure. The scope of the present disclosure is not limited by the above-described embodiments but only by the accompanying claims.

The invention claimed is:

1. A system comprising:
one or more servers connected by a network, a server of one or more servers implementing an application programming interface (API) for performing operations comprising:
pre-fetching, automatically by the API, file instances of different types of files from different types of applicatioins prior to receiving a search query relating to at least one file of the files from a querying application, wherein:
pre-fetching, by the API, the file instances enables the API to avoid, when the search query is received, reactively making separate requests to the different types of applications using separate APIs that are specific to each of the different types of applications;
the different types of applications comprise a plurality of target applications other than the querying application;
each file instance of the file instances comprises metadata describing user activity between a user and a file, the metadata including personal metadata that is specific to each file instance of the file instances; and
pre-fetching, by the API, the file instances comprises:
storing, by one or more automated manager functions of a server system implementing the API, a primary copy of each of the files in a respective electronic mailbox of an owner user who authored a respective file, the respective electronic mailbox of the owner user being implemented in the server system, wherein at least one electronic mailbox of the server is implemented in a separate housing, rack, room, building or geographic location from another electronic mailbox of the one or more servers; and
storing, by the one or more automated manager functions of the server system, a secondary copy of the respective file in a repective electronic mailbox of a second party that has formed a relationship with the respective file, the respective electronic mailbox of the second party being implemented in the server system, wherein the relationship is characterized by the user activity between the second party and the respective file, the owner user being different from the second party;
receiving, by the API from the querying application, the search query;
in response to receiving the search query, selecting, as search results, one or more file instances of the file instances that have been stored in one or more electronic mailboxes as part of the pre-fetching based on evaluating search criteria of the search query against the metadata of the one or more file instances; and
returning, by the API to the querying application, a search response indicative of the search results, wherein the one or more file instances are made available for access from the one or more electronic mailboxes through the querying application.

2. The server system of claim 1, wherein the different types of applications comprise any two or more of: word processing application, spreadsheet application, slideshow application, drawing application, email client, IM client, VoIP client, calendar application, collaborative workspace application, social media application, and file sharing application.

3. The server system of claim 1, wherein, if the search query does not specify a type of application as a search criterion, multiple different types of applications are search for inclusion in the search results.

4. The server system of claim 1, wherein the files comprise at least two file types including word processing files, spreadsheet files, slideshow files, drawing files, image files, and video files.

5. The server system of claim 4, wherein the different types of files comprise any two or more of: files, stored communications, calendar events, tasks, sites, and/or user profile information.

6. The server system of claim 4, wherein multiple different types of files are searched for inclusion in the search results when the search query does not specify a type of files as a search criterion.

7. The server system of claim 1, wherein each file instance of the file instances is stored in a form comprising a first portion and metadata, the first portion comprising either a duplication of the content of the file or a link to the file stored elsewhere.

8. The system of claim 1, wherein the relationship indicates:
the file has been shared with the second party by one or more other parties; or
the file has been shared by the second party with the one or more other parties.

9. the system of claim 8, wherein file instances of the files related to the user by different types of activity are included in the search results when the search query does not specify a start type of activity as a search criterion.

10. The system of claim 1, wherein at least one of the different types of applications are provided by a provider of the system but are hosted eleswhere within the system.

11. The system of claim 1, wherein at least one of the different types of applications are third-party sources outside of the system.

12. The system of claim 1, wherein at least two of the one or more servers are implemented in separate housing, racks, rooms, building or geographic locations.

13. The system of claim 1, wherein:
a server storage of the system comprises separate storage areas for a plurality of parties.

14. The server system of claim 13, wherein at least some of the separate storage areas are implemented on separate servers in separate housings, racks, room, buildings or geographic locations.

15. A method comprising:
pre-fetching, by an application programming interface (API), file instances of different types of files from different types of applications prior to receiving a search query relating to at least one file of the files from a queryiung application, wherein:
pre-fetching the file instances enables the API to avoid, when the search query is received, reactively making separate requests to the different types of applications using separate APIs that are specific to each of the different types of applications;
the different types of applications comprise a plurality of target applications other than the querying application;
each file instance of the file instances comprises metadata describing user activity between a user and a file, the metadata including personal metadata that is specific to each file instance of the file instances; and
pre-fetching the file instances comprises:
storing a primary copy of each of the files in a respective electronic mailbox of an owner user who authored a respective file, the respective electronic mailbox of the owner user being implemented in a server system implementing the API, wherein at least one electronic mailbox of the server system is implemented in a separate housing, rack, room, building or geographic locatioin from another electronic mailbox of the server system; and
storing a secondary copy of the respective file in a respective electronic mailbox of a second party that has formed a relationship with the respective file, the respective electronic mailbox of the second party being implemented in the server system, wherein the relationship is characterized by the user activity between the second party and the respective file, the owner user being different from the second party;
receiving, by the API from the querying application, the search query;
in response to receiving the search query, selecting, as search results, one or more file instances of the file instances that have been stored in the one or more electronic mailboxes as part of the pre-fetching based on evaluating search criteria of the search query against the metadata of the one or more file instances; and
returning, by the API to the querying application, a search response indicative of the search results, wherein the one or more file instances are made available for access to the quyerying application from the server system.

16. The method of claim 15, wherein the user activity between the user and the file indicates at least one of:
a time the file was last viewed or modified by the user;
the file is trending around the user; or
the file has been accessed by one or more other users having a defined relationship with the user.

17. The method of claim 15, wherein the metadata further includes connecting metadata indicating whether the file is the primary copy of the secondary copy.

18. The method of claim 17, wherein the respective electronic mailbox belongs to a non-owner user of the file.

19. A device comprising:
an application programmiing interface (API) for performing operations comprising:
pre-fetching, by the API, file instances of different types of files from different types of applications prior to receiving a search query relating to at least one file of the files from a querying application, wherein:
pre-fetching the file instances enables the API to avoid, when the search query is received, reactively making separate requests to the different types of applications using separate APIs that are specific to each of the different types of applications;
each file instance of the file instances comprises metadata describing user activity between a user and a file, the metadata including personal metadata that is specific to each file instance of the file instances; and
pre-fetching the file instances comprises:
storing a primary instance of each of the files in a respective electronic mailbox of an owner user who authored a respective file, the respective electronic mailbox of the owner user being implemented in a server system implementing the API, wherein at least one electronic mailbox of the server system is implemented in a separate housing, rack, room, building or geographic location from another electronic mailbox of the server system; and
storing a secondary instance of the respective file in a respective electronic mailbox of a second party that has formed a relationship with the respective file, the respective electronic mailbox of the second party being implemented in the server system, wherein the relationship is characterized by the user activity between the second party and the respective file;

receiving, by the API from the querying application, the search query;

in response to receiving the search query, selecting, as search results, one or more file instances of the file instances that have been stored in one or more electronic mailboxes as part of the pre-fetching based on evaluating search criteria of the search query against the metadata of the one or more files instances; and returning, by the API to the querying application, a search response indicative of the search results, wherein the one or more file instances are made available to the querying application.

20. The device of claim 19, wherein:

the owner user and the second party belong to a first organization; and the server system maintains a graph of relationships between a set of users and resources in the first organization, the set of users including the owner user and the second party.

\* \* \* \* \*